March 24, 1953  G. F. NADEAU ET AL  2,632,715
PROCESS OF SUBBING CELLULOSE ESTER
SHEET MATERIAL AND PRODUCT THEREOF
Filed March 8, 1949

GALE F. NADEAU
WALTER R. WHITE
INVENTORS

BY Daniel V. Mayne
H. N. Powell
ATTORNEYS

Patented Mar. 24, 1953

2,632,715

UNITED STATES PATENT OFFICE 2,632,715

PROCESS OF SUBBING CELLULOSE ESTER SHEET MATERIAL AND PRODUCT THEREOF

Gale F. Nadeau and Walter R. White, Rochester, N. Y., assignors to Eastman Kodak Company, Rochester, N. Y., a corporation of New Jersey Application March 8, 1949, Serial No. 80,262

2 Claims. (Cl. 117—73)

This invention relates to the manufacture of cellulose ester sheet material having a high degree of resistance to abrasion. More particularly the invention relates to a process involving application of a plurality of layers of an incompletely polymerized resinous material to cellulose ester sheets followed by a treatment designed to bring about an increase in the degree of polymerization of the resinous material.

As is well known, cellulose ester sheeting, such as sheeting composed of cellulose acetate, cellulose acetate butyrate and the like generally requires special treatment before it can be coated with other substances or united to sheets of various materials such as other cellulose esters, paper, metal foil and the like. To adapt such sheeting for certain industrial purposes, as for example, the manufacture of polarizing sheets and similar objects, by uniting it with the material containing the polarizing substance, or to adapt the sheeting for the application of other cellulose esters or related materials, it is necessary to alter the surface of the material to adapt it to receive the material which is to be applied. Generally, this treatment involves the application of an appropriate sub which, as is well known in the art to which the present invention relates, may be defined as an extremely thin coating deposited on a base sheet material to serve as an undercoat or sub-layer underneath a subsequently applied layer or sheet of the same or a different material than that of the base sheet.

While many different types of resinous substances have been applied to cellulose ester sheeting to adapt it for various purposes, to the best of our knowledge and belief, not until the advent of the present invention has it ever been proposed to prepare the surface of such sheeting by a procedure involving the use of superposed layers of incompletely polymerized resinous substances followed by an increase in degree of polymerization of the resinous material after deposition. One of the first difficulties encountered in dealing with resinous substances is that of providing a proper solvent or solvent combination in which the resinous material can be readily dissolved and which at the same time will provide a medium for the proper solvent attack on the base sheet material. In other words, it is, in general, out of the question to deposit a fully polymerized material on the base sheet because of the fact that most completely polymerized resinous substances are insoluble in the solvents which have the power of dissolving, softening, swelling or otherwise attacking the cellulose ester material.

The present invention has as an object to provide a simple and effective process for depositing resinous layers on cellulose ester sheet material to adapt it for various industrial uses. A further object is to provide a process whereby a plurality of incompletely polymerized resin layers may be effectually deposited on a cellulose ester base sheet material, such as a sheet composed of one of the single or mixed organic acid esters of cellulose, such as cellulose acetate or cellulose acetate butyrate, and whereby the resinous component of these resin layers may thereafter be further polymerized. A still further object is to provide a resin subbing technique which lends itself to the deposition on cellulose organic acid ester sheets of unpolymerized or partially polymerized resinous substances which are soluble in solvents or solvent combinations susceptible of use as subbing solvents. A specific object of the invention is to provide a subbing technique in which melamine urea formaldehyde and other thermosetting resins may be employed in an unpolymerized or at least incompletely polymerized form in which they are soluble in solvent or solvent combinations which have the power of dissolving, softening, swelling or otherwise attacking cellulose organic acid ester sheet material and which can be successfully used in the subbing of cellulose acetate and related cellulose ester sheet material. Another and more specific object is to provide a simple, economical and effective process for producing coatings or surfaces on cellulose ester sheet material which will have an unusually high resistance to abrasion. Other objects will appear hereinafter.

These objects are accomplished by the following invention which, in its broader aspects, comprises depositing on at least one surface of a cellulose ester sheet a sub composed of a mixture of a cellulose ester which is compatible with the cellulose ester material of the sheet and an unpolymerized or partially polymerized resin of the thermosetting type, depositing on the first sub one or more additional subs composed of an unpolymerized or partially polymerized resin and then bringing about an increase in the degree of polymerization of the resin components of the respective sub layers by subjecting the subbed sheet to the influence of a moderately elevated temperature.

As is known, the highly or completely polymerized thermosetting resins are notoriously insoluble in most solvents which will dissolve or attack the cellulose esters and for this reason have heretofore been unavailable for producing coatings or sub layers on cellulose ester sheeting. We have found, however, that if this type of resin or resinous material is first applied in unpolymerized or partially polymerized form, it may later be polymerized in situ after deposition on the sheeting. Specfically, our invention includes (1) dissolving the unpolymerized or partially polymerized resin, together with a certain amount of a cellulose derivative compatible with the cellulose ester material of which the base sheet is composed in a solvent or solvent combination which has the power of attacking the sheet material, (2) depositing the solution thus formed on the sheet in the form of a sub, whereby the solvent portion of the solution penetrates the sheet and carries into it and anchors to it the resinous and cellulose derivative components, (3) drying out a portion of the solvent from this first deposited layer, (4) thereafter depositing on the first layer a solution preferably composed of resin only, and preferably containing a polymerization catalyst, and (5) finally drying out the solvent from the deposited material by moderate heat, thereby simultaneously polymerizing the resinous components of both deposited layers in situ and leaving on the sheet a clear, transparent hardened coating having an unusual degree of resistance to abrasion. This, to the best of our knowledge and belief, is an entirely novel process and technique in the art of subbing or coating cellulose ester sheet material and, not only gives a result hitherto unattainable, but also opens up an entirely new field of application of the heat hardenable resins.

Figure 1:
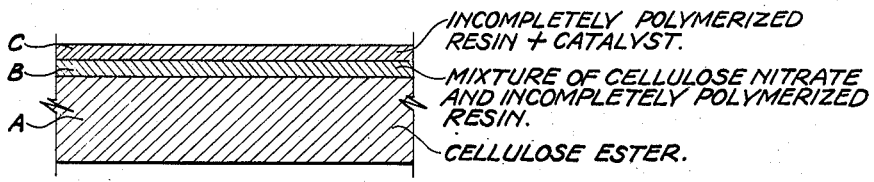
Figure 1 is a cross-section, in greatly exaggerated thickness, of an abrasion-resistant sheet in process of production in accordance with our invention and illustrating that stage in which the resin layers B and C are still in unpolymerized form.
Figure 2:
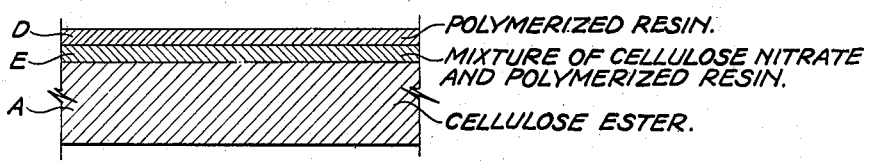
Figure 2 represents the same sheet after polymerization, polymerized layers in this view being designated E and D and corresponding, respectively, to original layers B and C of Figure 1.

In the following examples and description we have set forth several of the preferred embodiments of our invention, but they are included merely for purposes of illustration and not as a limitation thereof.

In producing abrasion-resistant sheeting in accordance with our invention, the preformed sheet material may be taken from a suitable supply, as for example, a storage roll, or, if more convenient, directly from a coating wheel on which the sheet is produced. Let us assume the sheet to be coming directly off such a wheel; in accordance with the invention, it may pass through a curing chamber generally known as a dryer section in which a series of rolls are rotatably positioned, generally in parallel upper and lower rows. If desired, the dryer may be constructed so as to have several compartments, to each of which air may be supplied separately at the desired temperature. Alternatively, the air may simply be supplied at a relatively high temperature at one end of the dryer, progressing through the various compartments one after another and finally emerging at the other end of the dryer at a lower temperature. For example, the air may enter at the compartment located at the delivery end of the dryer at a temperature of around 300° F. and emerge from the dryer through the compartment at the opposite end at a temperature of 150°-160° F. the warm air thus passing in countercurrent to the entire run of the sheeting.

A suitable sub hopper containing a solution of the unpolymerized or partially polymerized resin and a cellulose derivative, such as cellulose nitrate, for example, is positioned at the under run of one of the lower rolls near the entrance or feed end of a dryer section. The hopper is provided with a rotatably mounted applicator roll which, dipping in the solution, carries it up and into contact with the moving web or sheet of cellulose derivative. After the sheet has progressed past this first subbing station and gone over several sets of upper and lower rolls the solvent will have largely dried out or evaporated from the deposited layer. The sheet then contacts a second applicator roll which in the same manner applies another solution composed principally of unpolymerized resin and solvent and preferably containing a polymerization catalyst.

The treated sheet then passes through the remainder of the dryer over additional rolls, during which time the temperature of the material is gradually raised until it encounters a final or maximum curing temperature in the vicinity of 300° F. During these various stages of drying the solvent has been cured out of the deposited layers and the resinous components thereof have been polymerized in situ. The treated side of the sheet emerging from the final stage of curing has a hard, glossy surface which is highly resistant to abrasion, but has suffered no loss of transparency or an appreciable decrease in flexibility as a result of deposition of the resin thereon, a fact in itself indicating the unusual and unexpected nature of the results attained by our invention.

Our invention will be more fully understood by reference to the following specific examples.

*Example I*

A cellulose acetate butyrate base sheet is subbed on one side with a composition which may, for example, be composed of the following:

| | Per cent by weight |
|---|---|
| Unpolymerized melamine formaldehyde urea resin (50% solution) in equal parts of xylene and butanol | .4 |
| Cellulose nitrate | .2 |
| Methyl Cellosolve | 20.0 |
| Acetone | 79.4 |

After drying down of the deposited material at a temperature of about 150° F. there is deposited on the subbed surface of the sheet a second solution composed of the following:

| | Per cent by weight |
|---|---|
| Unpolymerized melamine formaldehyde urea resin (50% solution) in equal parts of xylene and butanol | 32.0 |
| Maleic acid (polymerization catalyst) | 5.0 |
| Ethylene chloride | 20.0 |
| Ethyl alcohol | 43.0 |

The sheet is then subjected to a final drying at a temperature which increases gradually from about 150° F. to a maximum of about 300° F. The treated side of the sheet is found to have a hard, glossy, clear, transparent surface which has an exceptional resistance to abrasion when tested by the Taber abrader.

*Example II*

A cellulose acetate butyrate sheet composed of 100 parts by weight of cellulose acetate butyrate plasticized with eight parts of triphenyl phosphate was subbed with a solution containing:

| | Per cent by weight |
|---|---|
| Cellulose nitrate | 1.0 |
| Uformite MU-56-A butanol modified urea-melamine-formaldehyde resin, 50% in equal parts of butyl alcohol and xylene | 1.0 |
| Methyl alcohol | 40.0 |
| Acetone | 58.0 |

After curing the coated sheet at a moderate temperature in the vicinity of 150° to 160° F. the coated surface of the sheet is then subbed with a solution composed of:

| | Per cent by weight |
|---|---|
| Uformite MU-56 | 32.0 |
| Para-toluenesulfonic acid | 5.0 |
| Ethylene dichloride | 20.0 |
| Ethyl alcohol | 43.0 |

The double coated sheet was cured at 200° F. for about three hours. After curing, the sheet was tested for abrasion resistance on a Taber abrader and it was found that it had to be abraded for five times the number of cycles and with four times the weight on the abrading wheel to mar the surface to a point equal to that occurring when a sheet of the same, but uncoated cellulose acetate butyrate material, was subjected to abrasion by the same test. The sheet was further tested by passing it around a metal roll surrounded by air at 300° F. with the resin-coated side in contact with the metal, after which it was found that there was no damage to the resin coating on the sheet, nor was there any sticking of the resin surface to the roll. The sheet was also found to be relatively non-brittle and the coating showed no tendency to lift or strip therefrom.

*Example III*

A sheet of the same type as referred to in Example II was subbed with the following composition:

| | Per cent by weight |
|---|---|
| Cellulose nitrate | 0.5 |
| BR-51-671-C (Glyptal resin) | 1.0 |
| Methyl alcohol | 20.0 |
| Ethylene chloride | 78.0 |

After curing at moderately elevated temperature of the order of 140° F. the subbed surface of the sheet was coated with a solution having the following composition:

| | Per cent by weight |
|---|---|
| Uformite MU-56 | 45.0 |
| Phosphoric acid conc. | 4.5 |
| Methyl alcohol | 50.5 |

Such a surface scatters only one-quarter the amount of parallel light after abrasion with the Taber abrader when compared with uncoated cellulose acetate butyrate abraded under the same conditions.

*Example IV*

A plasticized cellulose triacetate sheet was subbed with a solution of the following composition:

| | Per cent by weight |
|---|---|
| Cellulose nitrate | 1.0 |
| Phenol-formaldehyde resin | 1.0 |
| Mono-methyl ether of ethylene glycol | 10.0 |
| Methyl alcohol | 40.0 |
| Acetone | 48.0 |

After slight curing, this coated sheet was overcoated with a solution of the following composition:

| | Per cent by weight |
|---|---|
| Phenol-formaldehyde resin | 5.0 |
| Mono-methyl ether of ethylene glycol | 20.0 |
| Acetone | 75.0 |

After slight curing, this coated sheet was coated with a .01% solution of phosphoric acid in methyl alcohol. After heating the sheet for fifteen minutes at 180° F., a non-tacky, abrasion-resistant layer was formed. The phenol-formaldehyde resin used in coating this sheet was prepared by reacting equal quantities of phenol and 37% aqueous formaldehyde with hydrochloric acid as a catalyst and then following the procedure outlined on page 43 of the manual by Guyle and Houston entitled "Synthetic Plastics and Resinous Materials," 1944 edition, published by the Plastics Laboratory of General Electric Company, Pittsfield, Massachusetts.

While in the above examples we have chosen to illustrate our invention by reference to a base sheet which is subbed or coated on one surface only, it will, of course, be understood that the scope of our invention includes coating both surfaces of the sheet to produce the same abrasion-resistant effect on each. On the other hand, in most cases it may be desired to deposit the abrasion resistant coating on only one surface of the base sheet and treat the opposite surface in a different manner, as by depositing thereon a layer composed of polyvinyl alcohol, or gelatin or other material, to adapt the surface thus treated to be coated with, or laminated to, other sheet materials.

It will, of course, be understood that the specific resins set forth in the above examples are to be regarded as illustrative only, since the broad scope of our invention comprehends the use of any resin which, in unpolymerized or partially polymerized form, is soluble in solvents or solvent combinations which can be used as subbing solvents (solvents which dissolve, partially dissolve, swell, soften or otherwise attack cellulose derivative materials), and which is susceptible of being hardened under the influence of heat. While we prefer a resin of the type set forth in Example I, such as unpolymerized or partially polymerized melamine-formaldehyde-urea-resin, our invention includes the use of resins such as the alkyd resins, particularly those having three or more alcohol groups in the molecule, resins of the Santolite type typified by Santolite MH (para-toluene sulfonamide formaldehyde resin), certain of the alkyd resins susceptible of heat hardening and various others.

While the unpolymerized or partially polymerized resinous material deposited in the form of subs or coatings on the cellulose derivative base sheet may be polymerized and thus heat hardened under the influence of heat alone without a polymerization catalyst, we prefer to employ such a polymerization catalyst in that second layer, since this speeds up the process of polymerization and makes for a more practical manufacturing operation. The polymerization catalyst may be any strong acid, such as maleic, para-toluenesulfonic, phosphoric and the like. The acid will, of course, be selected with reference to its effect, not only as a polymerization catalyst, but also with respect to avoiding any corrosive action on machinery with which the sheet being manufactured comes in contact.

It may also be noted that the resin deposited on the sheet as the second layer may be of the same character as the resin component of the first deposited layer, or it may have a different chemical constitution. It goes without saying that in any event the resinous components of the first and second layers are each susceptible of being hardened under the influence of heat and/or the effect of the polymerization catalyst.

It will thus be seen that we have solved a problem of long standing in the cellulose derivative sheeting art, that is, the production on such sheeting, particularly sheeting composed of cellulose organic acid ester material, of a clear transparent, but hard and abrasion-resistant, coating composed of heat-hardenable resins. Our results are all the more outstanding when one takes into consideration the fact that, not only is the sheeting produced in accordance with our invention highly resistant to scratching or other abrasive effects, and thus particularly useful when employed for photographic uses, as in motion picture projectors, the manufacture of polarizing windshield visors and screens and similar articles, but also that its original flexibility is not appreciably altered by deposition of the resin coat.

What we claim is:

1. The process of subbing a cellulose acetate butyrate base sheet which comprises depositing on at least one surface of the sheet a solution composed of

| | Parts by weight |
|---|---|
| Unpolymerized melamine formaldehyde urea resin (50% solution) in equal parts of xylene and butanol | .4 |
| Cellulose nitrate | .2 |
| Methyl Cellosolve | 20.0 |
| Acetone | 79.4 | curing out the solvent from the deposited material whereby a resinous sub is formed on the sheet material, depositing on the resin sub thus formed a solution composed of

| | Parts by weight |
|---|---|
| Unpolymerized melamine formaldehyde urea resin (50% solution) in equal parts of xylene and butanol | 32 |
| Maleic acid (polymerization catalyst) | 5 |
| Ethylene chloride | 20 |
| Ethyl alcohol | 43 | and thereafter increasing the degree of polymerization of the resinous component of each of the deposited layers by subjecting the subbed sheet to a moderately elevated temperature of the order of 150° F. to 300° F.

2. As an article of manufacture a coated sheet having several distinct and separately applied coatings thereon, said coated sheet being essentially comprised of a cellulose acetate butyrate base, a wax-free cellulose nitrate sub on the surface of said base, said cellulose nitrate sub in addition to the cellulose nitrate component being essentially comprised of an unpolymerized melamine-formaldehyde-urea resin, said sub being overcoated with a wax-free separately applied coating of the same type essentially comprised of an unpolymerized melamine-formaldehyde-urea resin containing a polymerization catalyst, the aforementioned several coatings on the base sheet being capable upon being heated at moderately elevated temperatures of the order of 150–300° F. of polymerizing into a product having a hard glossy surface and in which the several coatings are securely bonded together by interaction between the aforesaid same type of resins.

GALE F. NADEAU.
WALTER R. WHITE.

REFERENCES CITED

The following references are of record in the file of this patent:

UNITED STATES PATENTS

| Number | Name | Date |
|---|---|---|
| 2,096,675 | Babcock | Oct. 19, 1937 |
| 2,301,959 | Lanning | Nov. 17, 1942 |
| 2,362,580 | Nadeau et al. | Nov. 14, 1944 |
| 2,389,708 | Zolad | Nov. 27, 1945 |

FOREIGN PATENTS

| Number | Country | Date |
|---|---|---|
| 114,508 | Australia | Jan. 22, 1942 |